P. M. METZLER.
SEED AND FERTILIZER DRILL.
APPLICATION FILED SEPT. 23, 1910.
1,006,771.
Patented Oct. 24, 1911.
2 SHEETS—SHEET 2.
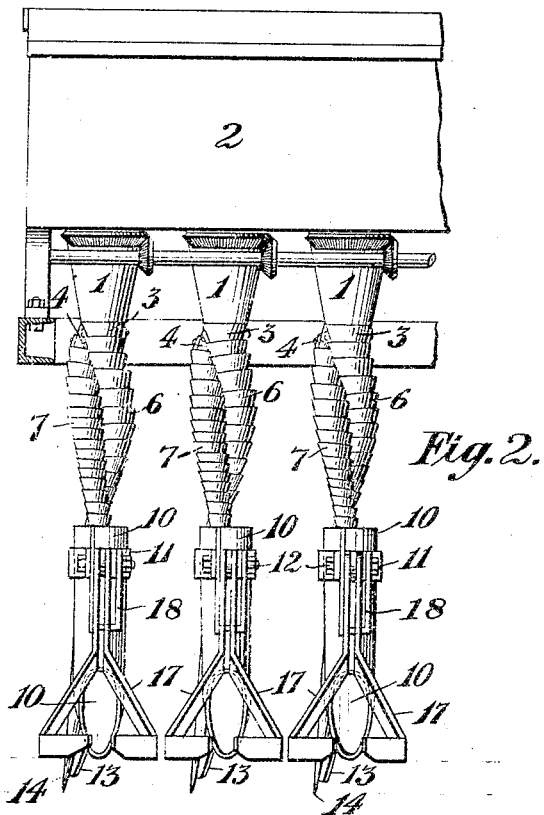
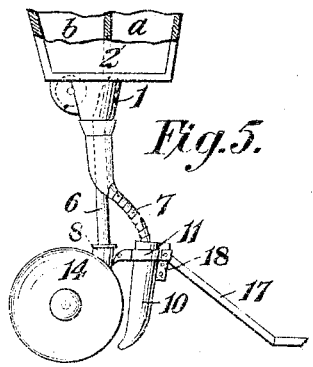
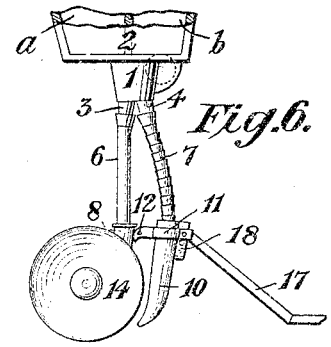
WITNESSES
INVENTOR
Peter Martin Metzler

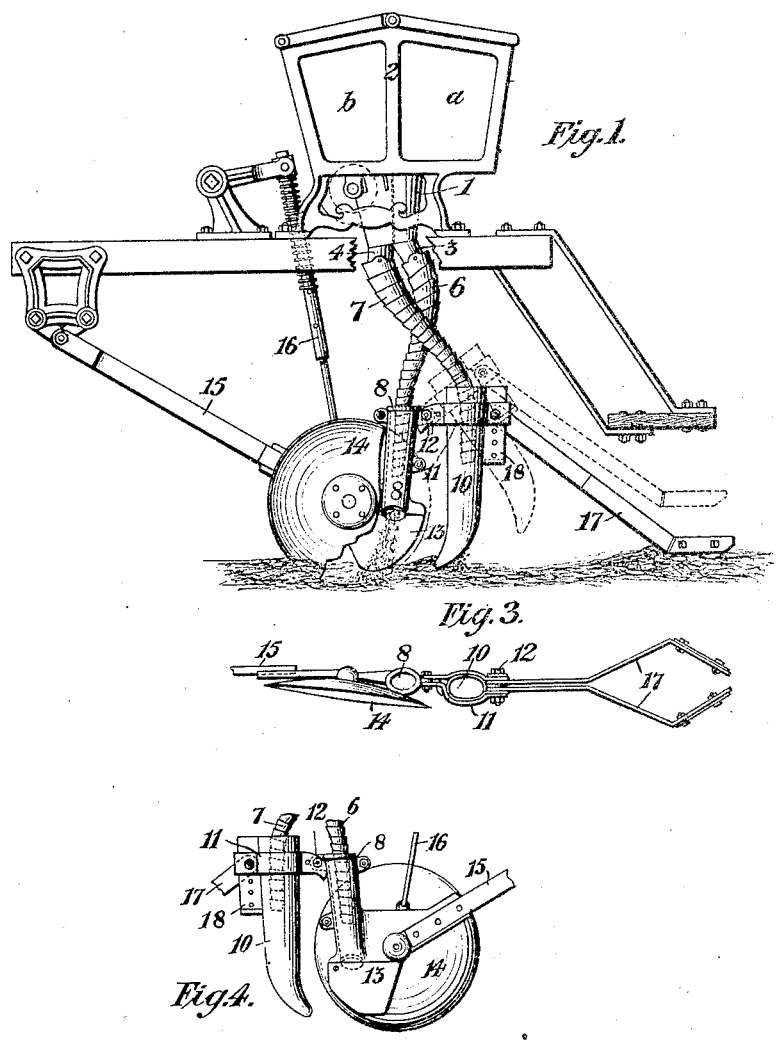

UNITED STATES PATENT OFFICE.

PETER MARTIN METZLER, OF ASCOT VALE, VICTORIA, AUSTRALIA.

SEED AND FERTILIZER DRILL.

1,006,771.

Specification of Letters Patent.

Patented Oct. 24, 1911.

Application filed September 23, 1910. Serial No. 583,430.

*To all whom it may concern:*

Be it known that I, PETER MARTIN METZLER, a subject of the King of Great Britain, residing at No. 66 Bloomfield road, Ascot Vale, in the State of Victoria, Commonwealth of Australia, have invented certain Improvements in Seed and Fertilizer Drills, of which the following is a specification.

This invention relates to improvements in sowing and fertilizing apparatus and consists in constructing "drill" or seed-sowing implements with the fertilizer and the grain sowing parts or appliances arranged to sow or place the fertilizer in drills or furrows beneath and below the grain or seed with a layer of earth or soil between them, and a covering of earth or soil above the grain, said system of sowing being done simultaneously, by the one implement or machine.

To convert existing drill or seed sowing implements so that they will sow the grain and fertilizer in accordance with this invention, a tubular seed hoe is hinged or attached at the back of the fertilizer drill disk spout or hoe, and into said attached hoe the flexible tube from the grain compartment of supply box is conducted, as will be hereinafter fully explained.

The great advantage or utility of this invention is that the resultant crop is much increased by its adoption or use, such being brought about by the roots of the grain establishing themselves deeper in the ground by approaching the lower position where the fertilizer is sown, and thus the grain plants being deeper in the soil are better prepared to stand any drought which may occur. Further, when the fertilizer is sown together with the grain, and a dry season is experienced, then the germination of the grain is affected, while when the fertilizer is below the grain, as above stated, the germination thereof will be in no way affected.

In order that the invention may be clearly understood, it will now be described with reference to the accompanying sheets of drawings, in which:—

Figure 1 is a side elevation, and Fig. 2 a rear view of as much of a seed sower or drill implement as is necessary to illustrate my invention. Fig. 3 is a plan of the disk hoe and drag harrow part of the implement. Fig. 4 a side view of the sowing parts shown in Fig. 1. Figs. 5 and 6 show modified arrangements of the grain and fertilizer delivery or conveying tubes, the former showing them leading from one branch under the supply box, and the latter when the fertilizer and grain bins are in the reverse position on the drill implement to that shown in the other figures.

To alter existing implements to suit this invention, that is to sow or place the fertilizer below the grain, a double mouth piece 1 is attached to the underside of the supply box 2, about the discharge openings from the fertilizer and grain bins *a* and *b* respectively, said mouth piece 1 being furnished with spouts 3 and 4 to which are connected the fertilizer and grain conveying or conducting tubes 6 and 7 respectively, the lower end of the former passing loosely into the fertilizer delivery tube 8, and the latter loosely to the grain hoe 10, which is securely held in a clamp 11 hinged at 12 to a lug projecting from the tube 8. Said conducting tubes 6 and 7 may be of any suitable flexible material or metal, the fertilizer tube 6 being preferably of aluminium, which will not be affected by the chemical action of the fertilizer.

The fertilizer spout 8 is attached to the disk cheek plate 13, between which latter and the lower part of the disk 14, the fertilizer is delivered into the furrow while the disk is carried on the hinge lever 15, and has a pressure exerted upon it by the spring actuated rod 16.

The clamp-carrier 11 is hinged to the fertilizer hoe 8 in such a manner that although the grain hoe 10 rises with the disk on meeting an obstruction, it has also an independent lift, so that it will readily ride over obstructions, while to the clamp bolt at back of said grain hoe 10 a pair of drag scrapers 17 are hinged, which are for the purpose of finally covering the grain with soil, and said bars 17 being hinged are also capable of riding over obstacles. Also said scraper 17 is lifted from the ground by the lower part of the adjustable hinge bracket 18 contacting with the bars 17, when the disk 12 and its attachments are lifted when backing or turning at the headlands by a lever (not shown) on the implement.

As illustrated in Fig. 1 the fertilizer is dropped or sown from spout 8 into the drill or furrow made by the disk 14, and is then covered by the layer of soil which falls into the drill or furrow behind the disk, while upon the latter layer of soil the grain is sown from hoe 10 and thus the fertilizer is laid at a depth of from one to one and a half inches or so below the grain, again the grain sown above the fertilizer is covered with soil by means of the hinged scraper bars or hoe 17. The position or height of the grain hoe 10 with relation to the lower edge of disk 14 can be adjusted in order to regulate the depth the grain is to be sown by securing the grain hoe 10, and its holed bracket 18, higher or lower in the hinged-carrier 11.

In the modification shown in Fig. 5 the fertilizer conducting tube 6 is shown arranged at its upper part concentrically within the grain conducting tube 7, and which latter branches back and into the hoe 10, while in Fig. 6 the fertilizer and grain conducting tubes, 6 and 7 respectively, fall direct from the supply box to the spout 8 and tubular hoe 10, as in this case the position of the fertilizer and grain supply bins are reversed, that is to say, the fertilizer bin lies at the front part and the grain bin at the back part of the supply box 2, carried on the implement.

I would have it understood that I do not confine myself to the precise construction of the parts described and shown for carrying out my invention, as the same may be varied without departing from the object and purpose of my invention, and further it will be well understood that the invention may be carried out on a "hoe drill" as well as on a "disk drill" implement.

Having now described my invention what I claim as new and desire to secure by Letters Patent is:—

1. In a machine of the class described, in combination, a fertilizer bin, a grain bin, a disk, a spout supported thereby, means for conveying the fertilizer from its bin to said spout, a tubular hoe hinged to said spout and positioned in the rear thereof, means for conveying the grain from its bin to said tubular hoe, said tubular hoe being positioned to cover the fertilizer and sow the grain thereon, and means for covering the grain.

2. In a machine of the class described, in combination, a fertilizer bin, a grain bin, a disk, a spout supported thereby, means for conveying the fertilizer from its bin to said spout, a vertically adjustable hoe hinged to said spout and positioned in the rear thereof, means for conveying the grain from its bin to said tubular hoe, said tubular hoe being positioned to cover the fertilizer and sow the grain thereon, and means for covering the grain.

3. In a machine of the class described, in combination, a fertilizer bin, a grain bin, a disk, a spout supported thereby, means for conveying the fertilizer from its bin to said spout, a tubular hoe hinged to said spout and positioned in the rear thereof, means for conveying the grain from its bin to said tubular hoe, said tubular hoe being positioned to cover the fertilizer and sow the grain thereon, and a hinged scraper positioned in rear of said tubular hoe for covering the grain with soil.

In witness whereof I have hereunto set my hand in presence of two witnesses.

PETER MARTIN METZLER.

Witnesses:
 BEDLINGTON BRIDGCOMB,
 W. J. S. THOMPSON.